(12) United States Patent
Elbarky

(10) Patent No.: US 7,941,824 B2
(45) Date of Patent: May 10, 2011

(54) METHODS, SYSTEMS AND COMPUTER PROGRAM PRODUCTS FOR PROVIDING A MEDIA FILE TO A DESIGNATED SET-TOP BOX

(75) Inventor: Mahmoud Elbarky, Douglasville, GA (US)

(73) Assignee: AT&T Intellectual Property I, LP, Reno, NV (US)

(*) Notice: Subject to any disclaimer, the term of this patent is extended or adjusted under 35 U.S.C. 154(b) by 134 days.

(21) Appl. No.: 11/510,925

(22) Filed: Aug. 28, 2006

(65) Prior Publication Data

US 2008/0066130 A1    Mar. 13, 2008

(51) Int. Cl.
*H04N 7/173* (2006.01)
*G06F 15/16* (2006.01)
(52) U.S. Cl. .......................................... 725/93; 709/206
(58) Field of Classification Search ..................... 725/93; 455/414.1; 709/206, 207
See application file for complete search history.

(56) References Cited

U.S. PATENT DOCUMENTS

| 2002/0056119 | A1* | 5/2002 | Moynihan ........................ 725/87 |
| 2003/0023854 | A1* | 1/2003 | Novak et al. ................... 713/182 |
| 2004/0103437 | A1* | 5/2004 | Allegrezza et al. ............. 725/95 |
| 2008/0051071 | A1* | 2/2008 | Vishwanathan et al. ... 455/414.1 |

OTHER PUBLICATIONS

Sonic Blue, ReplayTV 5000 User's Guide, 2002.*
No Author, "Messenger Tutorial—Installation and Setup", Jan. 19, 2004 (http://www.24by7.ca/tutorials/msn2.shtml).*
Gregg Keizer, "Instant Messaging Road-Test", Feb. 26, 2002 (http://www.zdnet.com/au/reviews/software/internet/print.htm?TYP).*
Wittress et al., "Windows CE.Net 4.2 and Windows XP Embedded-Scalable Software Platforms for Building Flexible, IP Set-Top Boxes" Microsoft Windows Embedded IP Set Top Boxes, Microsoft Corporation, Sep. 2003, pp. 1-19.

* cited by examiner

*Primary Examiner* — Andrew Y Koenig
*Assistant Examiner* — Jason M Thomas
(74) *Attorney, Agent, or Firm* — Myers Bigel Sibley & Sajovec, P.A.

(57) ABSTRACT

Methods of providing a media file include receiving the media file and an identification of a destination set-top box for the media file at a server device. The received media file is transmitted from the server device to the identified set-top box in an Internet protocol television (IPTV) multimedia format.

11 Claims, 7 Drawing Sheets

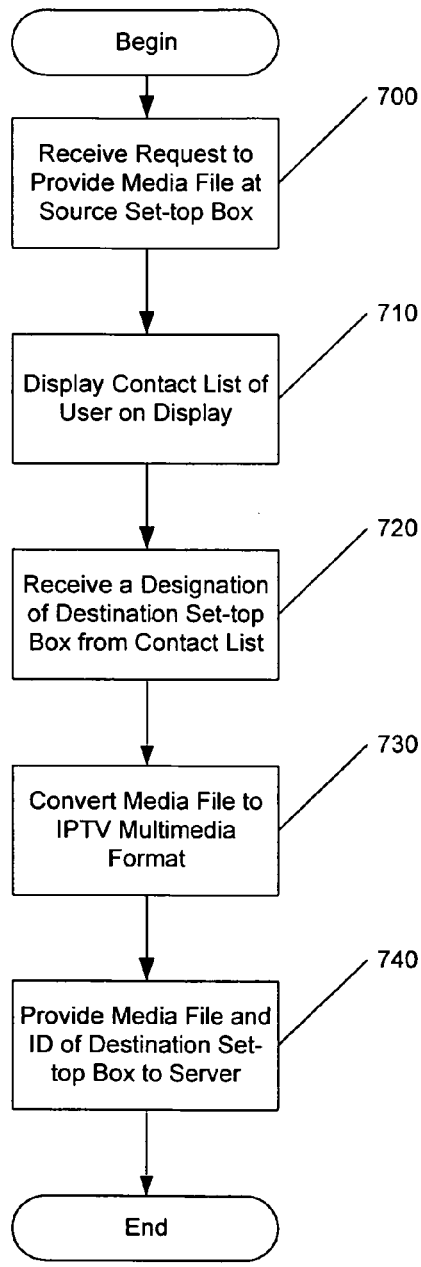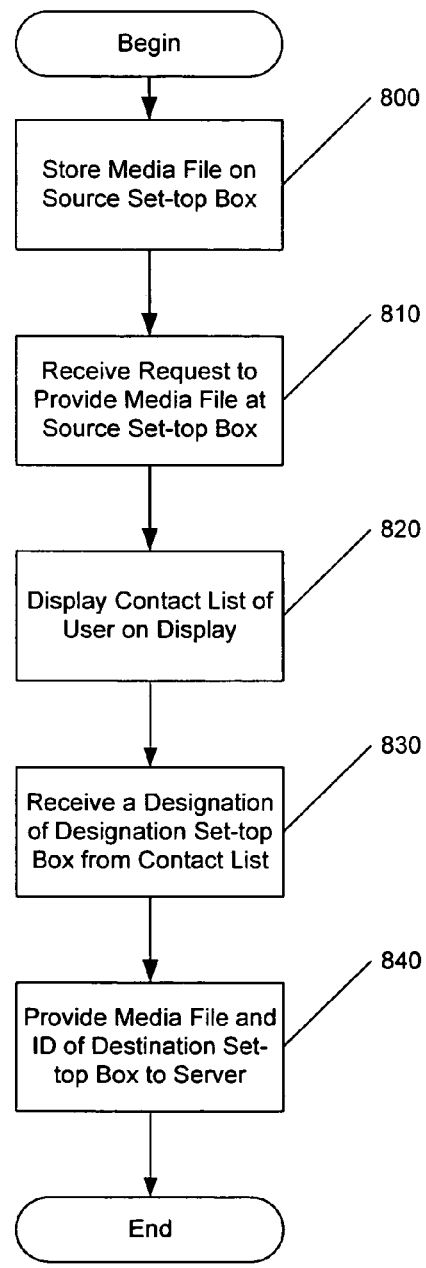
Figure 7
Figure 8

METHODS, SYSTEMS AND COMPUTER PROGRAM PRODUCTS FOR PROVIDING A MEDIA FILE TO A DESIGNATED SET-TOP BOX

BACKGROUND OF THE INVENTION

The present invention relates to methods, systems and computer program products for providing media files and more particularly, to providing media files in a format suitable for tuning on a set-top box.

Smart devices, such as personal computers and the like, are now generally provided with communications capabilities. For example, such devices are typically provided with wired or wireless access to the Internet to allow for downloading and viewing of content from Internet Service Providers (ISPs), electronic mail (email) communications and the like. In addition, such devices are often also configured for presenting other forms of media such as music or video.

One type of smart device is a set-top box that may be used to receive a television signal and display the signal on a television monitor. Such devices have been used, for example, to receive conventional cable television (CATV) and satellite TV broadcast signals. In addition, it has been proposed that media, such as broadcast network television or the like, may be provided using the internet protocol based on a proposed Internet Protocol Television (IPTV) standard using IP set-top boxes as the receiving device.

An IP set-top box is generally a dedicated computing device that serves as an interface between a television set and a broadband network. IP set-top boxes can generally provide functionality that includes video-on-demand (VOD), Electronic Program Guide (EPG), digital rights management (DRM) and other interactive and multimedia services. They also generally decode and render broadcast TV signals and can also support features, such as Web browsing, e-mail and viewing e-mail attachments, advanced multimedia codecs, home networking, personal computer connectivity, gateway functionality, instant messaging (IM), and real-time voice over IP (VoIP).

Using broadcast protocols, very large size media services, such as movies and the like, may readily be delivered to and shared with users. In contrast, delivery of media files by email and the like, while available to an individual user of a computing device, may be limited, particularly for very large files. This may limit the amount and/or quality of video or the like that may be conveniently shared between individuals using such means. As such, these larger files generally cannot be easily provided to even IP set-top boxes and sharing of such larger files with relatives or the like may be limited.

SUMMARY OF THE INVENTION

In some embodiments of the present invention, methods of providing a media file include receiving the media file and an identification of a destination set-top box for the media file at a server device. The received media file is transmitted from the server device to the identified set-top box in an Internet protocol television (IPTV) multimedia format. The media file may be received from a source set-top box in the IPTV multimedia format or the received media file may be converted to the IPTV multimedia format at the server device. The media file and the identification of the destination set-top box may be received from a source set-top box having an associated Internet protocol (IP) address.

In other embodiments, transmitting the received media file is preceded by transmitting an authorization request to the identified set-top box and receiving a response to the authorization request. Transmitting the received media file includes transmitting the received media file based on the received response. Transmitting the received media file based on the received response may include not transmitting the received media file when the received response denies the authorization request. The media file may be received from a user and receiving a response to the authorization request may be followed by notifying the user that the received media file has not been provided to the destination set-top box when the received response does not authorize transmitting the media file to the destination set-top box.

In further embodiments, transmitting the received media file is preceded by receiving a request to add the destination set-top box to a contact list of a user. A request is transmitted to the destination set-top box to validate the request to add the destination set-top box to the contact list. A response is received from the destination set-top box responsive to the transmitted request. The destination set-top box is added to the contact list based on the received response.

In other embodiments, receiving the media file is preceded by receiving a request to provide the media file from the user. The contact list is displayed to the user responsive to the received request to provide the media file. A designation of a set-top box in the contact list is received to provide the identification of the destination set-top box.

In further embodiments, transmitting the received media file based on the received response is preceded by determining if the destination set-top box has sufficient memory space available to receive the received media file. The destination set-top box is requested to make sufficient memory space available when it is determined that the destination set-top box does not have sufficient memory space available to receive the received media file.

In yet other embodiments, the methods further include the following carried out at a client device: identifying the media file; providing the identification of the destination set-top box for the media file; converting the received media file to the IPTV multimedia format; and providing the converted media file and the identification of the destination set-top box to the server device. The client device may be a source set-top box having an associate Internet protocol (IP) address and identifying the media file may include storing the media file in a memory of the source set-top box.

In other embodiments, identifying the media file includes receiving a request to provide the media file from a user at the source set-top box. A contact list of the user is displayed to the user on a display of the source set-top box responsive to the received request to provide the media file. A designation of a set-top box in the contact list is received to provide the identification of the destination set-top box.

Server devices configured to carry out the above-described methods are also provided. Computer program products for providing a media file, the computer program products including computer program code embodied in a computer readable medium, the computer program code comprising program code configured to carry out the above described methods, are also provided.

In yet further embodiments, methods of providing a media file include identifying the media file and providing an identification of a destination set-top box for the media file. The media file is converted to an Internet protocol television (IPTV) multimedia format. The converted media file and the identification of the destination set-top box are provided to a server device for transmission to the destination set-top box.

In other embodiments, identifying the media file and providing the identification of the destination set-top box include receiving a request to provide the media file from a user at a source set-top box. A contact list of the user is displayed to the user on a display of the source set-top box responsive to the received request to provide the media file. A designation of a set-top box in the contact list is received to provide the identification of the destination set-top box. Set-top boxes configured to carry out the above-described methods are also provided.

In yet other embodiments, methods of providing a media file include storing the media file on a source set-top box. A request to provide the media file is received from a user at the source set-top box. A contact list of the user is displayed to the user on a display of the source set-top box responsive to the received request to provide the media file. A designation of a set-top box in the contact list is received to provide an identification of a destination set-top box. The media file and the identification of the destination set-top box are provided to a server device for transmission to the destination set-top box.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIGS. 4 to 8 are flowcharts illustrating methods of providing a media file according to some embodiments of the present invention.

DETAILED DESCRIPTION OF EXEMPLARY EMBODIMENTS

Figure 1:
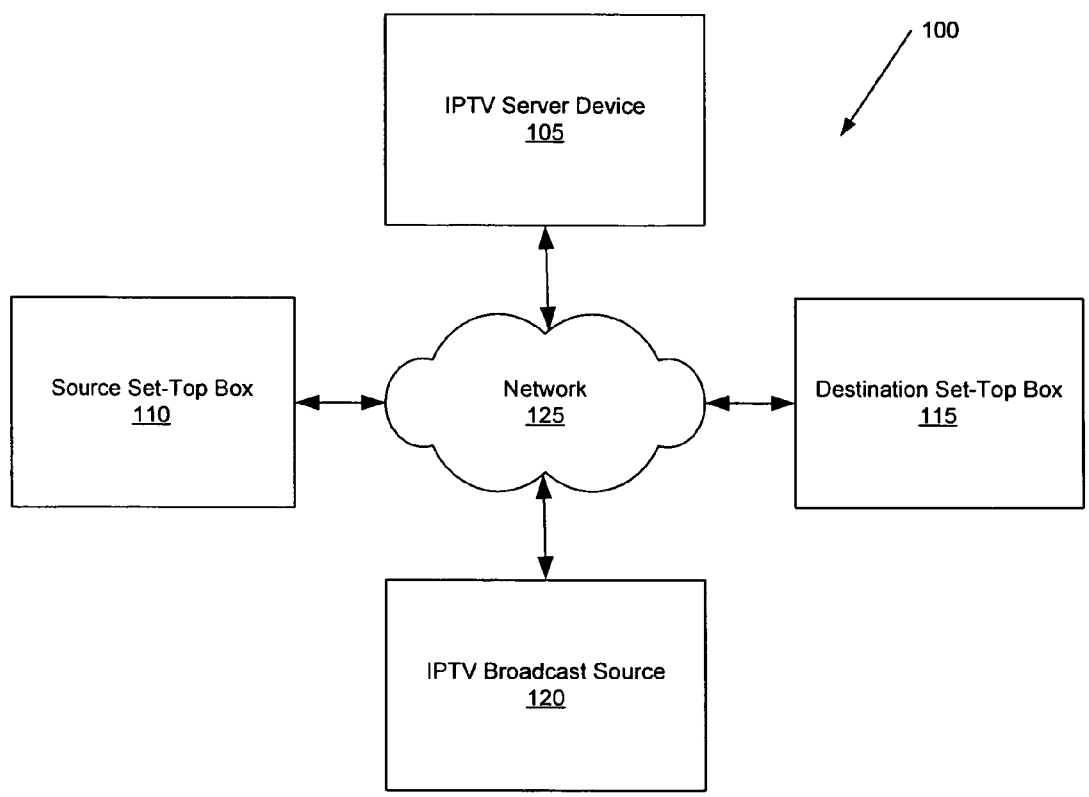
FIG. 1 is a block diagram of a hardware and software environment in which the present invention may operate according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

Embodiments of the present invention will now be described below with respect to FIGS. 1 through 8. Referring first to FIG. 1, a hardware and software environment in which the present invention may operate according to some embodiments is illustrated. As shown in the embodiments of FIG. 1, the environment 100 includes an IPTV server device 105, and a source set-top box 110 and destination set-top box 115 coupled over a network 125. As will be understood by those having skill in the art, the network 125 may include a plurality of separate linked physical communication networks, which, using a protocol such as the Internet protocol (IP), may appear to be a single seamless communications network to user application programs. It is further to be understood that, while for illustration purposes in FIG. 1, the network 125 is shown as a single network, it may be comprised of a plurality of separate interconnected physical networks.

Also shown in the embodiments of FIG. 1 is an IPTV broadcast source 120. The IPTV broadcast source 120 may be, for example, a network source having a scheduled broadcast of television programming to which set-top boxes 110, 115 may tune at the scheduled times in a manner similar to over-air broadcast television.

As will be described for various embodiments of the present invention, the source set-top box 110 may be configured to provide a media file to the destination set-top box 115 using the IPTV server device 105. As such, a user of the set-top box 110 may be provided the ability to upload a multimedia file, such as a picture, movie, or the like, from the user's television set-top box (or personal computer on a network coupled to the IPTV set-top box 110) to another person using a set-top box, such as the destination set-top box 115. For example, a user of the source set-top box 110 may have taken a home movie or picture of a new baby that they may then send using the IPTV server device 105 to a grandparent's destination set-top box 115 to watch on the grandparent's television or the like coupled to the destination set-top box 115. Thus, in some embodiments of the present invention, a user of the source set-top box 110 may be provided a way to share multimedia files with family and friends while avoiding some of the limitations encountered when attempting to do so using known services, such as electronic mail.

Furthermore, while the IPTV broadcast source 120 and the IPTV server device 105 are shown as separate devices in the illustrated embodiments of FIG. 1, it will be understood that the service offered by the server device 105, as described herein, may be provided by the IPTV broadcast source 120 in addition to or rather than by a separate service provider. As such, the IPTV broadcast source 120 service provider may be able to provide the media file delivery features as described herein in connection with marketing of their IPTV broadcast television offerings.

Figure 2:
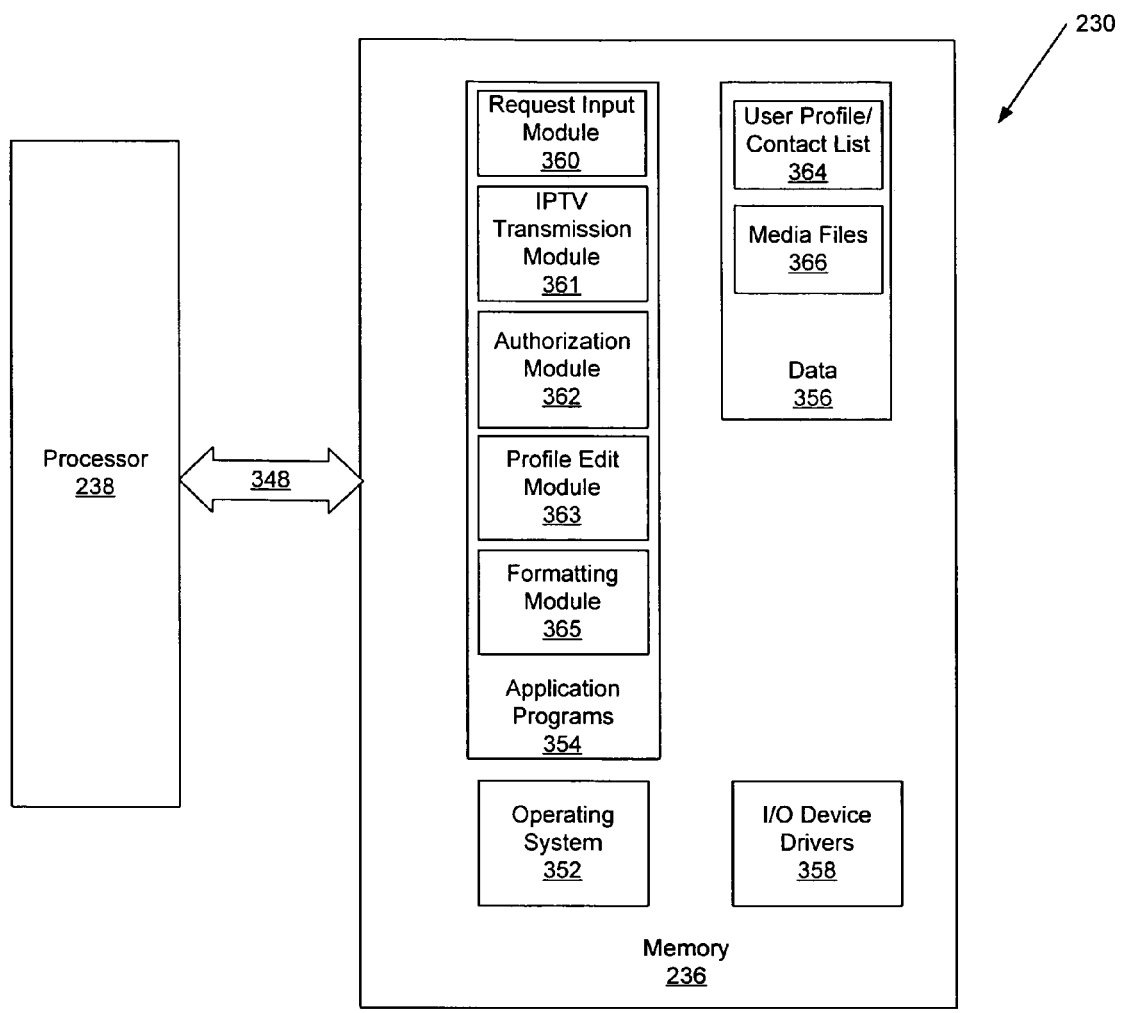
FIG. 2 is a block diagram of a data processing system according to some embodiments of the present invention.
Figure 3:
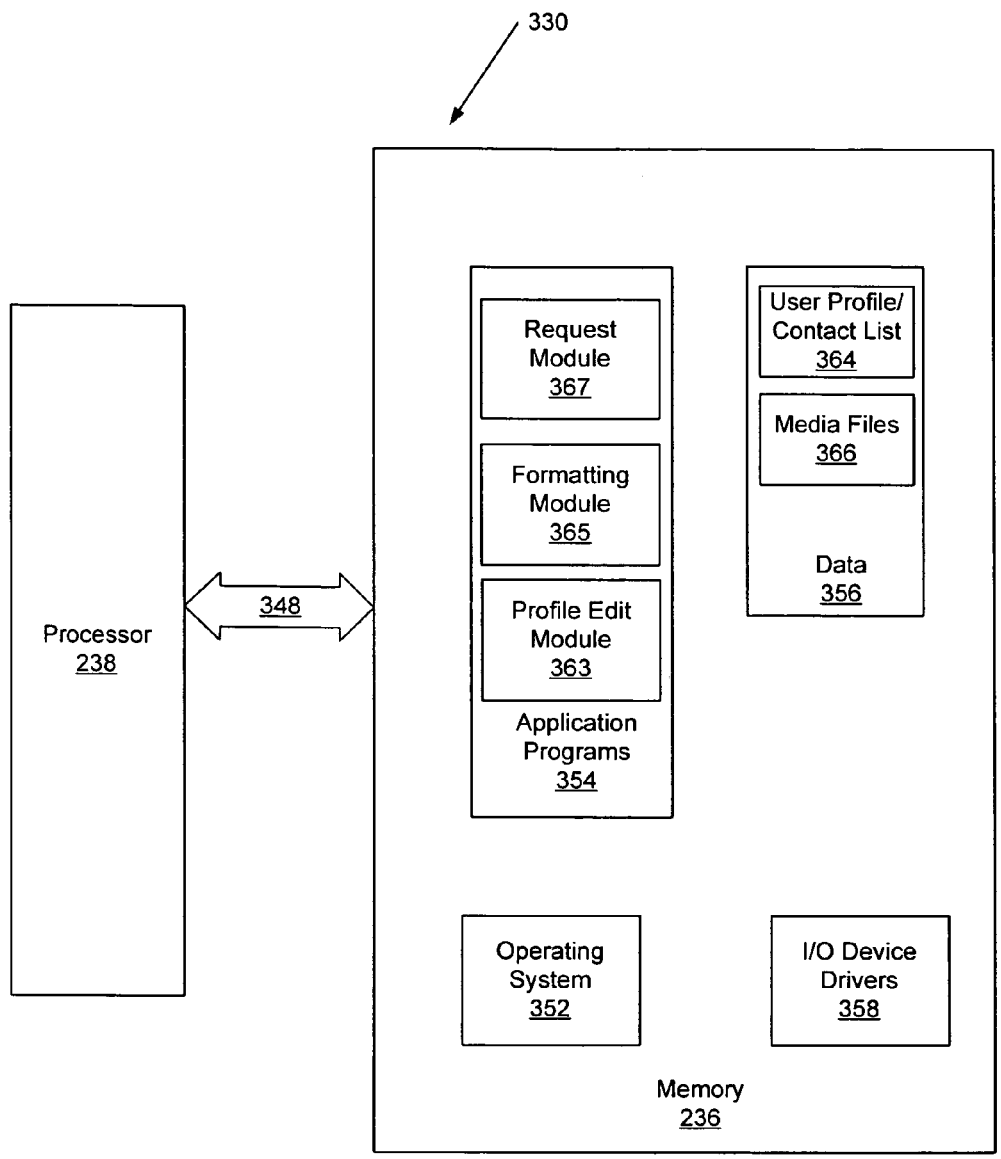
FIG. 3 is a block diagram of a data processing system according to further embodiments of the present invention.
Figure 4:
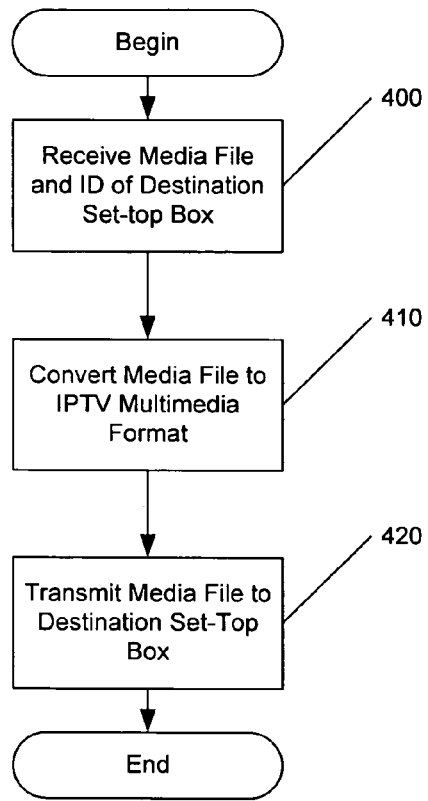

FIG. 2 is a block diagram of a data processing system 230 that illustrates methods, systems and computer program products for providing a media file in accordance with some embodiments of the present invention. FIG. 3 is a block diagram of a data processing system 330 that illustrates methods, systems and computer program products for providing a media file in accordance with further embodiments of the present invention. More particularly, FIG. 2 illustrates embodiments of a server device that provides a media file to a destination set-top box while FIG. 3 illustrates embodiments of a source set-top box that requests transmission of a media file to a destination set-top box.

The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230, 330. The memory 236 can include, but is not limited to, the following types of devices: cache, ROM, PROM, EPROM, EEPROM, flash memory, SRAM, and DRAM.

As shown in FIGS. 2 and 3, the memory 236 may include several categories of software and data used in the data processing system 230, 330: the operating system 352; the application programs 354; the input/output (I/O) device drivers 358; and the data 356. As will be appreciated by those of skill in the art, the operating system 352 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows2000 from Microsoft Corporation, Redmond, Wash., Unix or Linux. The I/O device drivers 358 typically include software routines accessed through the operating system 352 by the application programs 354 to communicate with input/output devices, such as a display, keyboard and/or the like, and certain memory 236 components. The application programs 354 are illustrative of the programs that implement the various features of the data processing system 230, 330 and preferably include at least one application that supports operations according to embodiments of the present invention. Finally, the data 356 represents the static and dynamic data used by the application programs 354, the operating system 352, the I/O device drivers 358, and other software programs that may reside in the memory 236.

As illustrated in the embodiments of FIG. 2, the application programs 354 may include a request input module 360, an IPTV transmission module 361, an authorization module 362, a profile edit module 363 and/or a formatting module 365. The request input module 360 may be configured to receive a media file to be provided to a destination set-top box and receive an identification of the destination set-top box. The request and media file may be received, for example, from a source set-top box, such as the source set-top box 110 of FIG. 1. The source set-top box 110 may have an associated Internet protocol (IP address) and the network 125 may be configured to support IP based communications between connected devices.

The IPTV transmission module 361 may be configured to transmit the received media file from the IPTV server device 105 to the identified destination set-top box 115 in an Internet protocol television (IPTV) multimedia format. In embodiments where the IPTV server device 105 is incorporated as part of the IPTV broadcast source 120, the IPTV transmission module 361 may further provide support for transmission of the IPTV broadcast programming of the IPTV broadcast source 120.

As will be described for some embodiments herein, authorization may be obtained from the destination set-top box 115 before transmission of a media file responsive to a request from the source set-top box 110. In such embodiments, the authorization module 362 may be configured to transmit an authorization request to an identified destination set-top box 115 and receive a response to the authorization request from the destination set-top box 115. Transmission of an identified media file by the IPTV transmission module 361 may then be controlled based on the response received by the authorization module 362. In other words, an identified media file may not be transmitted when the received response denies the authorization request sent by the authorization module 362. Thus, the destination set-top box 115 may, in some embodiments, either accept or deny transmission of the media file. Conditional acceptance may also be provided, such as requesting delayed delivery of the media file until some later time when the destination set-top box 115 may have greater capacity or resources for receiving and/or storing the media file and/or when a user of the destination set-top box 115 may be available to view the media file during transmission thereof to the destination set-top box 115 rather than storing the media file for later viewing.

The profile edit module 363, in some embodiments, may be provided as a component of the IPTV server device 105 to provide for editing of a contact list of a user of the source set-top box 110, which contact list may be included in a profile of the user including information in addition to the contact list. The contact list may then be used for identification of destination set-top boxes for delivery of media files. The profile edit module 363 may be configured to receive a request to add a destination set-top box to the contact list, transmit a request to the destination set-top box to validate the request to add the destination set-top box to the contact list and receive a response from the destination set-top box responsive to the transmitted request. The profile edit module 363 may further be configured to add the destination set-top box to the contact list based on the received response.

In some embodiments, formatting of the media file to the Internet protocol television (IPTV) multimedia format is performed by the formatting module 365 at the IPTV server device 105. As such, the formatting module 365 may be configured to convert a received media file to the IPTV multimedia format where the received media file is received by the requested input module 360 in another format.

The data 356 illustrated in the embodiments of FIG. 2 includes user profile/contact list data 364 and media files 366. The media files 366 may be temporary storage used to store media files received by the request input module 360 until they have been transmitted to a destination set-top box by the IPTV transmission module 361. In some embodiments, media files may be maintained for additional time in the media file data 366 stored at the IPTV server device 105. For example, individual users may be provided some amount of memory at the IPTV server device 105 for their use. The amount of memory provided to respective users may further be varied based upon factors, such as the amount paid by the respective users for the service. Similarly, the user profile contact list 364 may be maintained by the IPTV server device 105 for respective registered users of a media file providing service offered by the IPTV server device 105. Where such a contact list is maintained at the IPTV server device 105, the request input module 360 may receive an identification of a destination set-top box that identifies a listed set-top box in the contact list for a user stored in the user profile/contact list data 364. As such, the identification received by the request input module 360 need not include an entire address supporting delivery of the media file to the destination set-top box. Furthermore, as will be described for some embodiments herein, the identification may be provided by displaying entries in a contact list to the user and receiving a designation of one of those entries in the contact list as the identification of the destination set-top box.

Further embodiments of the present invention will now be described with reference to the block diagram illustration of FIG. 3. In particular, the embodiments of FIG. 3 illustrate a set-top box 330 according to some embodiments of the present invention, such as the source set-top box 110 of FIG. 1. As seen in the embodiments of FIG. 3, the application programs 354 for the set-top box 330 may include a request module 367, a formatting module 365 and/or a profile edit module 363. The request module 367 may be configured to receive a request to provide a media file from a user of the set-top box 330 and an identification of a destination set-top box to which the media file is to be delivered. The request module 367 may further be configured to provide the media file and identification of the destination set-top box to the server device 105. In some embodiments, the request module 367 may be configured to receive an identification of the destination set-top box by displaying a contact list to the user responsive to a received request to provide the media file and receive a designation of a set-top box in the contact list as the identification of the destination set-top box. The request module 367 may further be configured to store the media file associated with the requests in the data 356 of the set-top box 330.

The formatting module 365, in some embodiments, may operate as described previously with reference to FIG. 2 where the formatting to the IPTV multimedia format is performed at the set-top box 330 before transmission to the server device 105. The profile edit module 363 in the set-top box 230 may similarly perform substantially as described with reference to the profile edit module 363 of the server device 230 of FIG. 2.

The data 356 illustrated in the set-top box 330 of FIG. 3 includes the user profile/contact list 364 and media files data 366, which may be configured substantially as described with reference to the server device 230 of FIG. 2. However, the user profile/contact list 364 and media files data 366 of the set-top box 330 may contain only media files and user profiles for a user or users of the particular set-top box 330, while the user profile/contact list 364 and/or media files data 366 of the server device 230 of FIG. 2 may contain information and media files associated with a plurality of different users of a plurality of different set-top box devices utilizing the services of the server device 230.

While the present invention is illustrated, for example, with reference to the request input module 360 and the other modules discussed above being application programs in FIGS. 2 and 3, as will be appreciated by those of skill in the art, other configurations may also be utilized for the various modules of FIGS. 2 and 3 described as application programs while still benefiting from the teachings of the present invention. For example, the request input module 360 may also be incorporated into the operating system 352 or other such logical division of the data processing system 230. Thus, the present invention should not be construed as limited to the configuration of FIGS. 2 and 3 but is intended to encompass any configuration capable of carrying out the operations described herein.

Some embodiments of methods for providing a media file will now be described with reference to the flowchart illustrations of FIGS. 4 through 8. Referring first to the embodiments illustrated in FIG. 4, operations begin with receiving the media file and identification of a destination set-top box for the media file at a server device (block 400). In some embodiments of the present invention, the received media file is converted to an Internet protocol television (IPTV) multimedia format (block 410). The conversion to the IPTV multimedia format at block 410 may occur at a source set-top box or other provider of the media file or at a server device receiving the media file at block 400. As such, in some embodiments, the received media file may be received at block 400 in the IPTV multimedia format from a source set-top box or other requesting device, in which case further conversion of the media file format may not be provided.

The received media file is transmitted from the server device to the identified destination set-top box in the IPTV multimedia format (block 420). It will be understood that, in some embodiments, operations at block 400 may include receiving the media file and the identification of the set-top box from a source set-top box having an associated Internet protocol (IP) address.

Figure 5:
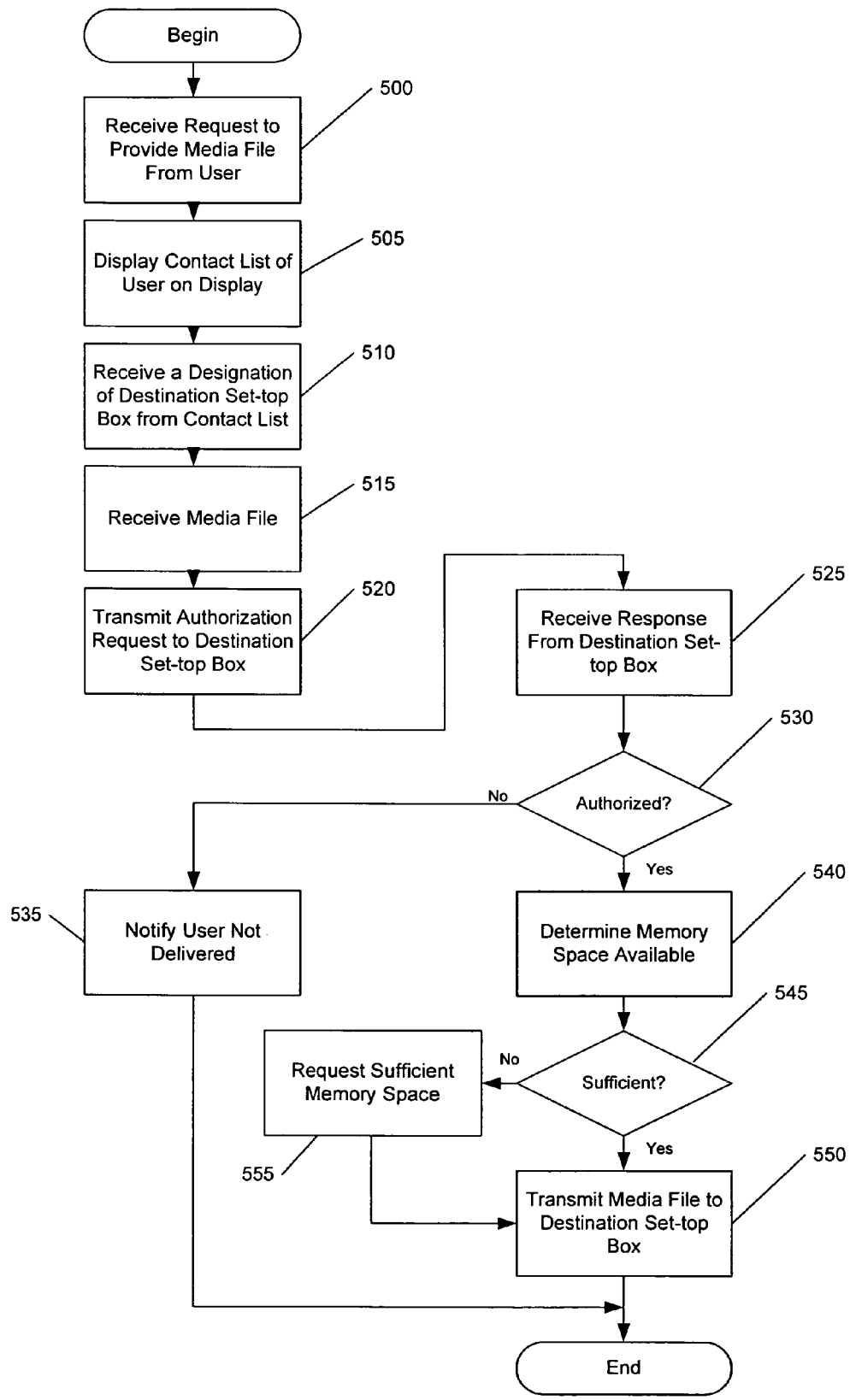

Further embodiments of methods of providing a media file will now be described with reference to the flowchart illustration of FIG. 5. As seen in the embodiments of FIG. 5, operations begin with receiving a request to provide the media file from a requesting user (block 500). A contact list of the requesting user is displayed to the user responsive to the received request to provide the media file (block 505). A designation of a set-top box in the contact list is received to provide the identification of the destination set-top box (block 510). The operations described with reference to blocks 500-510 may be carried out by a source set-top box or other requesting device, by a server device supporting the providing of the media file to a destination set-top box or by a combination of the two. The media file and an identification of a destination set-top box for the media file are received at a server device (block 515).

In the embodiments illustrated in FIG. 5, an authorization request is transmitted to the identified destination set-top box (block 520). A response to the authorization request is received from the destination set-top box (block 525). The identified media file is then transmitted to the destination set-top box based on the received response at block 525 as will now be described with reference to blocks 530 through 555 for some embodiments of the present invention.

If the response received at block 525 indicates that transmission of the media file has not been authorized (block 530), the identified media file is not transmitted and the requesting user is notified that the identified media file has not been provided to the destination set-top box (block 535). When the response authorizes transmission (block 530), in the embodiments illustrated in FIG. 5, it is determined if the destination set-top box has sufficient memory space available to receive the identified media file (block 540). If it is determined that the destination set-top box does not have sufficient memory space available to receive the identified media file (block 545), the destination set-top box is requested to make sufficient memory space available (block 555). In other words, if it is desired to store the entirety of the media file on the destination set-top box for later viewing or otherwise, sufficient memory space may be created on the destination set-top box before transmission begins. However, it will be understood that, in other embodiments of the present invention, transmission may be provided following authorization without establishing sufficient memory space, for example, where the recipient will be viewing the media file upon receipt so sufficient memory to store the entire media file will not be needed. In any event, after sufficient memory space is made available at block 555 or is determined to be available at block 540 (block 545), then the media file is transmitted from the server device to the identified destination set-top box in the IPTV multimedia format (block 550).

Figure 6:
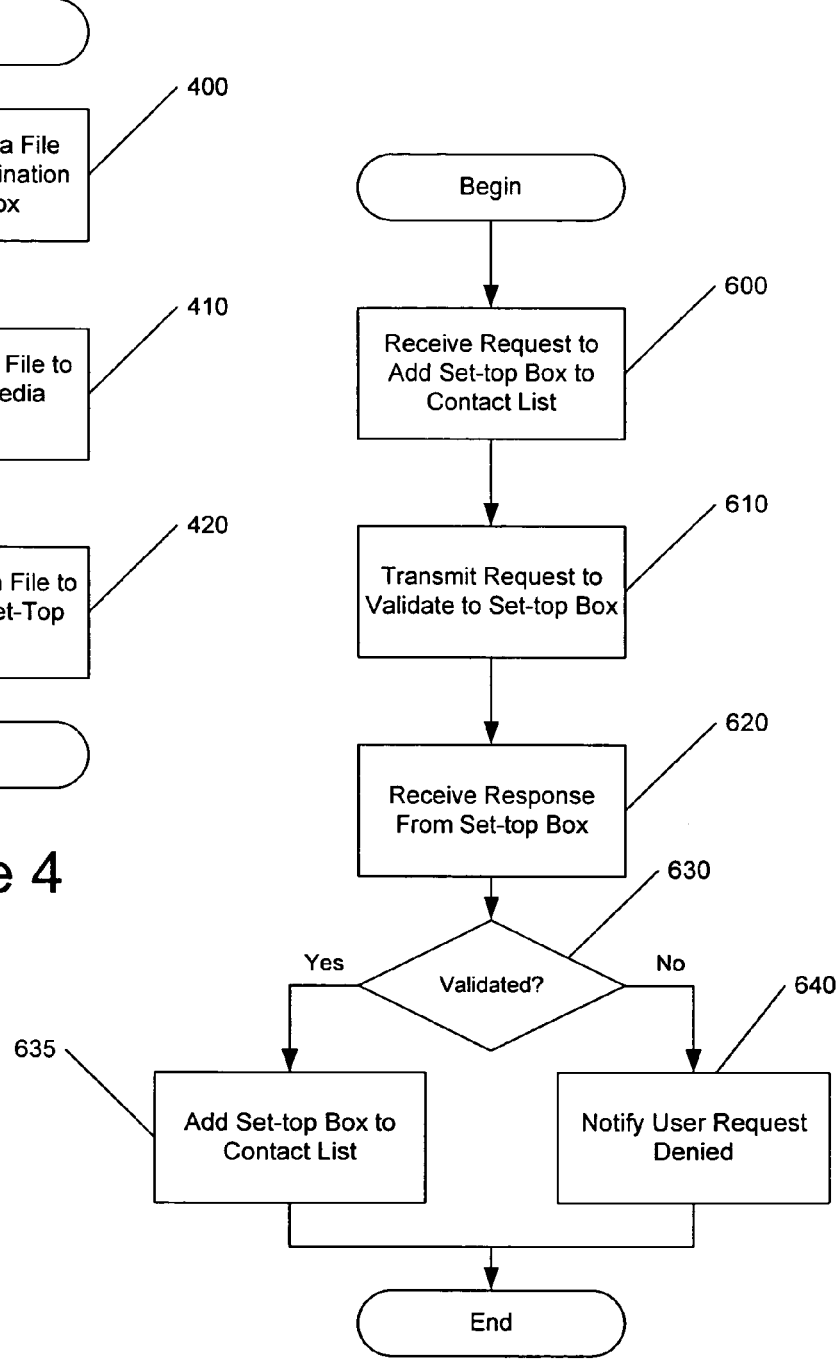

Further embodiments of the present invention for providing a media file to a destination set-top box will now be described with reference to the flowchart illustration of FIG. 6. More particularly, the operations illustrated in FIG. 6 relate to adding a destination set-top box to a contact list of a user. As shown in the embodiments of FIG. 6, operations begin by receiving a request to add a destination set-top box to a contact list of a user (block 600). A request is transmitted to the destination set-top box to validate the request to add the destination set-top box to the contact list (block 610). A response is received from the destination set-top box responsive to the transmitted request (block 620). If the response received at block 620 validates the request to add the set-top box to the contact list (block 630), the set-top box is added to the user's contact list (block 635). If the response received at block 620 does not validate the request (block 630), the user is notified that the request has been denied (block 640).

Operations related to providing a media file according to further embodiments of the present invention will now be described with reference to the flowchart illustration of FIG. 7. More particularly, the flowchart illustration of FIG. 7 illustrates operations that may be carried out by a source set-top box or other requesting device coupled to the IPTV server device 105 to initiate providing a media file to a destination set-top box 115. As shown in the embodiments of FIG. 7, operations begin with identifying the media file to be provided and providing an identification of the destination set-top box as will be described with reference to block 700-720. For the embodiments illustrated in FIG. 7, identifying the media file includes receiving a request to provide the media file from a user at a source set-top box 110 (block 700). A contact list of the requesting user is displayed on a display of the source set-top box 110 responsive to the received requests at block 700 (block 710). A designation of a set-top box in the contact list is received to provide the identification of the destination set-top box 115 (block 720).

The media file is converted to an IPTV multimedia format (block 730). The converted media file and the identification of the destination set-top box are provided to a server device 105 for transmission to the destination set-top box 115 (block 740).

Further embodiments of the present invention for providing a media file will now be described with reference to the flowchart illustration of FIG. 8. As with the embodiments of FIG. 7, the operations as described with reference to FIG. 8 more particularly correspond to operations carried out at a source set-top box providing a media file for delivery to the destination device. Operations begin for the embodiments of FIG. 8 by storing the media file on the source set-top box 110 (block 800). A request is received to provide the media file from a user at the source set-top box (block 810). A contact list of the requesting user is displayed to the user on a display of the source set-top box 110 responsive to the request received at block 810 (block 820). A designation of a set-top box in the contact list is received to provide an identification of the destination set-top box 115 (block 830). The media file and the identification of the destination set-top box are provided to a server device 105 for transmission to the destination set-top box 115 (block 840).

As described above, in various embodiments of the present invention, a user of the media file providing service may first set up their contacts securely by accessing their IPTV user profile over a network and sending requests to add contacts. The contacts may be notified by email or the like to update their profile (i.e., addressing information and the like) and may accept or reject the request to be added to the user's contact lists. Subsequently, a multimedia file may be identified by the user, which file may be converted to a compatible file format associated with set-top box devices, such as the MPEG-4 or similar standards. The conversion may be provided by a variety of file converter software that is generally available or may be provided to the customer as part of a service offer for the media file delivery service. Similar limitations may be provided, such as limiting the file size of the media file to a tunable size that may be based on the type of drives associated with the source and/or destination set-top boxes, such as 512 MB and/or 1 GB. The file may then be sent to the source set-top box for review and loading via home or network connection a USB storage device or the like, where the set-top box may be given an IP address on a network and/or have a USB input port available and have the proper software available to handle the loading of a media file to be sent. Once the media file is ready for loading onto the source device, the user may select a load icon or the like from the set-top box and a list of a setup contacts or the like may be displayed for selection. After recipient contacts are selected and confirmed, the user may press the "send" icon or the like to initiate uploading of the media file to a sever device for delivery. The file may then be sent through the modem on the Internet traffic portion of the set-top box connection or the like and may be saved at the sever until a file is completely received from the source device.

Identified contacts may be notified of availability of the incoming file and asked to either accept or reject the file. If the request is denied, the sender may be notified and if the request is accepted the server may send the file and/or first verify that sufficient space is available on the destination set-top box hard drive before sending the file to the destination set-top box IP address associated with the contacts selected by the requesting user from their contact list. The IP addresses of the contacts may be set up as part of a contact set-up process and included in the media file or the like. Note that if there is insufficient space available on the hard drive of the destination recipient device, then the receiving set-top box may be prompted to delete existing files or take other action to make sufficient space available. A sender may be notified upon successful download of the media file to the destination device, after which the media file may be available for viewing on the hard drive of the destination set-top box device.

Figure 9:
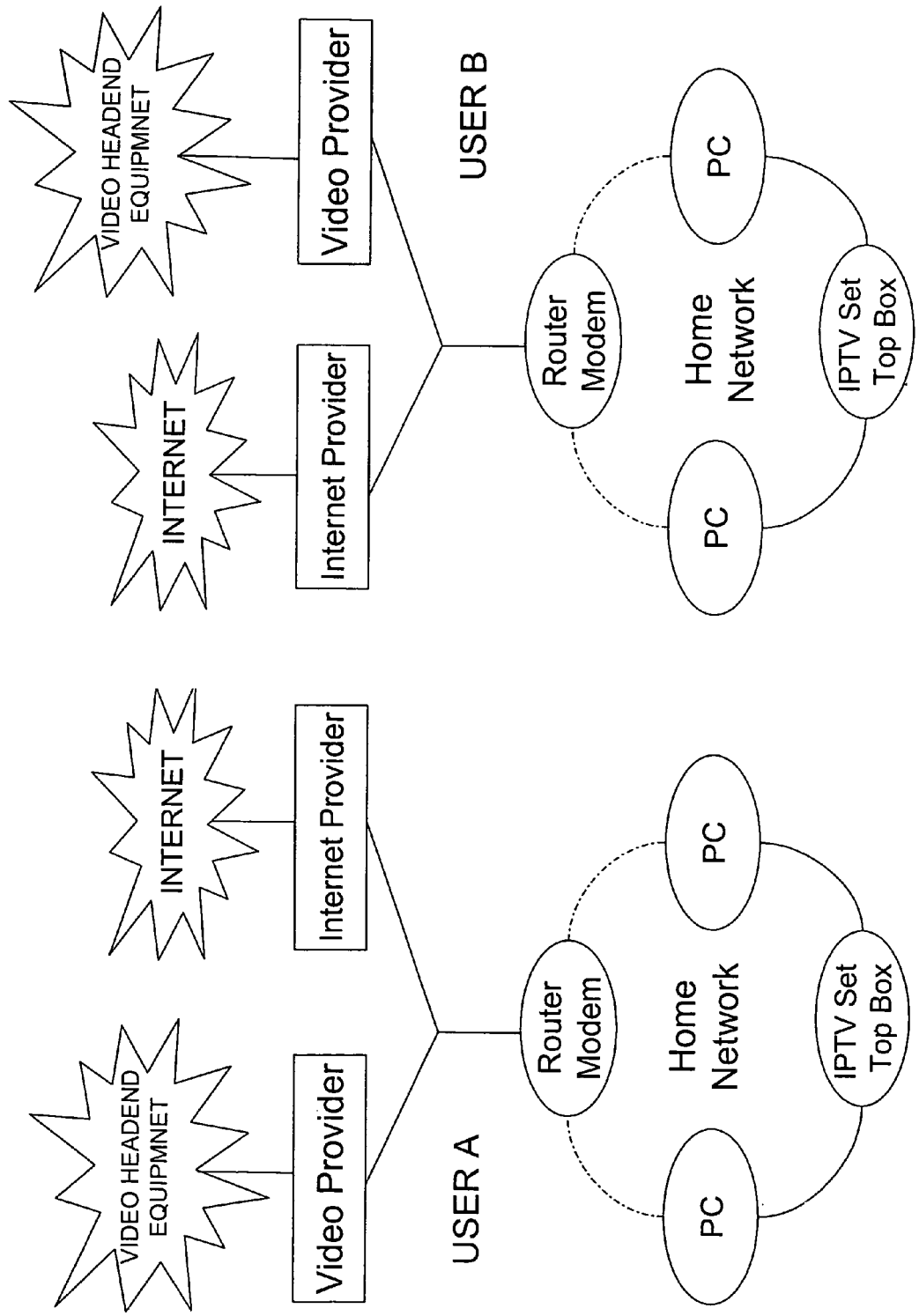
FIG. 9 is a block diagram of a hardware and software environment in which the present invention may operate according to further embodiments of the present invention.

Further embodiments of the present invention are illustrated in the block diagram illustration of FIG. 9. More particularly, as seen in the embodiments of FIG. 8, the respective set-top boxes may reside on home networks of respective users A and B that may operate under various situations as either source or destination device associated users. Similarly, each of user A and user B may have connections through a router modem or the like to both an Internet service provider and a video provider supporting IPTV format multimedia delivery to respective set-top boxes addressably coupled to the user's home networks. It will be understood that, while the video provider and Internet provider connections to each user's home network are shown as separate links, the traffic in the IP format from each of the respective providers may be intermingled on a common hardware connection, such as a DSL line or cable connection, to the respective users.

As will be appreciated by one of skill in the art, the present invention may be embodied as a method, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams of FIGS. 1 through 9 illustrate the architecture, functionality, and operations of some embodiments of methods, systems, and computer program products for providing a media file. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of providing a media file, comprising:
    at a source set-top box, identifying the media file and receiving a request to add a destination set-top box to a contact list of a user; then
    transmitting a request to the destination set-top box to validate the request to add the destination set-top box to the contact list;
    receiving a response from the destination set-top box responsive to the request that was transmitted, the response that was received comprising a denial or an acceptance;
    adding the destination set-top box to the contact list when the response that was received is an acceptance and not adding the destination set-top box to the contact list when the response that was received is a denial;
    receiving the media file that was identified and an identification of the destination set-top box for the media file that was identified from the source set-top box having an associated Internet protocol address at a server device, when the response that was received was an acceptance from the destination set-top box that was identified; and
    transmitting the media file that was received from the server device to the destination set-top box in an Internet protocol television multimedia format.

2. The method of claim 1, wherein the media file that was received is received from the source set-top box in the Internet protocol television multimedia format.

3. The method of claim 1, wherein receiving the media file is followed by converting the media file that was received to the Internet protocol television multimedia format.

4. The method of claim 1, wherein transmitting the media file that was received is preceded by:
    transmitting an authorization request to the destination set-top box; and
    receiving a response to the authorization request; and
    wherein transmitting the media file that was received comprises transmitting the media file that was received based on the response that was received, including not transmitting the media file that was received when the response that was received denies the authorization request.

5. The method of claim 4, wherein transmitting the media file that was received based on the response that was received is preceded by:
    determining if the destination set-top box has sufficient memory space available to receive the media file; and
    requesting that the destination set-top box make sufficient memory space available when it is determined that the destination set-top box does not have sufficient memory space available to receive the media file.

6. The method of claim 4, wherein the media file is received from the user and wherein receiving a response to the authorization request is followed by notifying the user that the media file has not been provided to the destination set-top box when the response that was received does not authorize transmitting the media file to the destination set-top box.

7. The method of claim 1, wherein identifying the media file comprises:
   receiving a request to provide the media file that was identified from the user.

8. The method of claim 1, further comprising the following carried out at the source set-top box:
   providing the identification of the destination set-top box for the media file that was identified;
   converting the media file that was received to the Internet protocol television multimedia format; and
   providing the media file that was converted and the identification of the destination set-top box to the server device.

9. The method of claim 8, wherein identifying the media file comprises storing the media file that was identified in a memory of the source set-top box.

10. The method of claim 9, wherein:
    storing the media file that was identified in a memory of the source set-top box comprises selecting a "load" icon from the source set-top box; and
    providing the media file that was converted and the identification of the destination set-top box to the server device comprises selecting a "send" icon from the source set-top box.

11. The method of claim 8, wherein identifying the media file comprises:
    receiving a request to provide the media file that was identified from the user at the source set-top box;
    displaying a contact list of the user to the user on a display of the source set-top box responsive to the request that was received to provide the media file that was identified; and
    receiving a designation of a set-top box in the contact list to provide the identification of the destination set-top box.

* * * * *